United States Patent
Lin et al.

(10) Patent No.: US 11,989,280 B2
(45) Date of Patent: May 21, 2024

(54) POINTER AUTHENTICATION FAILURE DETECTION

(71) Applicant: Microsoft Technology Licensing, LLC, Redmond, WA (US)

(72) Inventors: Jin Lin, Seattle, WA (US); Jason Lin, Bellevue, WA (US); Matthew John Woolman, Seattle, WA (US); Mehmet Iyigun, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

(21) Appl. No.: 17/489,390

(22) Filed: Sep. 17, 2021

(65) Prior Publication Data
US 2023/0088081 A1     Mar. 23, 2023

(51) Int. Cl.
*H04L 29/06* (2006.01)
*G06F 12/10* (2016.01)
*G06F 21/52* (2013.01)

(52) U.S. Cl.
CPC .......... *G06F 21/52* (2013.01); *G06F 12/10* (2013.01); *G06F 2212/657* (2013.01); *G06F 2221/033* (2013.01)

(58) Field of Classification Search
CPC .... G06F 21/52; G06F 12/10; G06F 2212/657; G06F 2221/033
See application file for complete search history.

(56) References Cited

U.S. PATENT DOCUMENTS

| 2016/0110545 A1* | 4/2016 | Acar ............ G06F 21/52 726/23 |
| 2018/0173539 A1* | 6/2018 | Warkentin ......... G06F 9/4401 |
| 2021/0200546 A1* | 7/2021 | Lemay ............ G06F 12/145 |

(Continued)

FOREIGN PATENT DOCUMENTS

WO    2021148134 A1    7/2021

OTHER PUBLICATIONS

"Pointer Authentication on ARMv8.3 Design and Analysis of the New Software Security Instructions", Retrieved From: https://www.qualcomm.com/content/dam/qcomm-martech/dm-assets/documents/pointer-auth-v7.pdf, Jan. 31, 2017, 12 Pages.

(Continued)

*Primary Examiner* — Evans Desrosiers
(74) *Attorney, Agent, or Firm* — Workman Nydegger

(57) ABSTRACT

Handling a memory fault based on detecting whether a memory pointer was invalidated by a pointer authentication (PA) failure. After an access to a memory pointer causes a memory fault, detecting that the memory pointer was invalidated by a PA failure includes creating a new memory pointer by replacing reserved bits of the memory pointer with a default value, and determining that the new memory pointer corresponds to a memory address that falls within executable memory. This determination includes determining that the memory address is within an executable memory page, determining that a call instruction is stored at a prior memory address that immediately precedes the memory address, and/or determining that the memory address corresponds to a code section of an executable file. The PA failure is handled based on logging the PA failure, terminating the application program, and/or resuming execution at an instruction stored at the memory address.

20 Claims, 5 Drawing Sheets

(56) References Cited

U.S. PATENT DOCUMENTS

2021/0200685 A1\* 7/2021 Gabor ................. G06F 12/0895
2021/0350262 A1\* 11/2021 Song .................. G06Q 20/4016
2022/0283813 A1\* 9/2022 Neiger ................ G06F 9/30145

OTHER PUBLICATIONS

Liljestrand, et al., "PAC It Up: Towards Pointer Integrity Using ARM Pointer Authentication", Retrieved From: https://www.usenix.org/system/files/sec19fall_liljestrand_prepub.pdf, Feb. 3, 2021, 18 Pages.

Liljestrand, et al., "PACStack: An Authenticated Call Stack", Retrieved From: https://www.usenix.org/system/files/sec21summer_liljestrand.pdf, Nov. 11, 2020, 18 Pages.

"International Search Report and Written Opinion Issued in PCT Application No. PCT/US22/038990", dated Nov. 25, 2022, 13 Pages.

\* cited by examiner

300

| 301<br>(No Return Address Protection) | 302<br>(PAC-Based Return Address Protection) |
|---|---|
| 1:<br>2: str  lr,[sp,#-0x10]!<br>3: sub  sp,sp,#0x10<br>4: ...<br>5: add  sp,sp,#0x10<br>6: ldr  lr,[sp],#0x10<br>7:<br>8: ret | 1: paciasp<br>2: str     lr,[sp,#-0x10]!<br>3: sub     sp,sp,#0x10<br>4: ...<br>5: add     sp,sp,#0x10<br>6: ldr     lr,[sp],#0x10<br>7: autiasp<br>8: ret |

FIG. 3

POINTER AUTHENTICATION FAILURE DETECTION

BACKGROUND

Since the adoption of executable-space protection technologies, such as the no-execute (NX) bit and Data Execution Prevention (DEP), it is difficult for attackers to directly insert new malicious code into a program's memory space and execute that code (e.g., by using a buffer overrun to insert new code onto the program's data stack). Thus, many modern-day attacks are carried out using return-oriented programing (ROP). With ROP, an attacker diverts a program's control flow by manipulating the program's data stack (e.g., by exploiting a vulnerability, such as a buffer overrun) to overwrite a return address with a replacement return address of the attacker's choosing. When a subroutine relying on this return address exits, the replacement return address causes execution of attacker-chosen executable code that is already present in executable memory. This attacker-chosen executable code is usually within the program code itself, or within a linked library. Libraries often contain subroutines and other functionality that can enable the attacker to gain greater access to the computer system.

Some processors—such as those designed by ARM Ltd. of Cambridge, England—include support for Pointer Authentication (PA), which can be used to mitigate against ROP attacks on a program's data stack. In particular, PA technology adds at least one instruction to a processor's instruction set architecture (ISA) (e.g., an instruction prefixed with "pac" in the ARM ISA) that creates an authenticated pointer. For example, on ARM processors, a pac instruction cryptographically generates a Pointer Authentication Code (PAC) based on a pointer address (together with other data), and stores that PAC within reserved bits of the pointer (which, in turn, prevents the authenticated pointer from being used directly). PA technology also adds at least one instruction to the processor's ISA (e.g., an instruction prefixed with "aut" in the ARM ISA) that authenticates a subject pointer. For example, on ARM processors, an aut instruction generates a new PAC from the subject pointer, and compares the new PAC with the values of reserved bits within the pointer (which store an existing PAC, if the pointer is an authenticated pointer). On ARM processors, an aut instruction then removes the existing PAC from the pointer if the new PAC and the existing PAC match (e.g., by restoring the reserved bits to a default value); otherwise, an aut instruction invalidates the pointer (e.g., by scrambling the reserved bits)—such that a dereference or call using the invalidated pointer will cause a memory-related fault (e.g., a memory translation fault). For example, if a pointer corresponds to a return address used by a return instruction of a subroutine (e.g., the ret instruction in the ARM ISA), execution of that return instruction causes a memory translation fault when that pointer that has been invalidated by PA.

BRIEF SUMMARY

However, the inventors have recognized that PA technologies provide no mechanism to deterministically detect that a pointer was invalidated due to a PA failure, or that PA prevented a ROP attack on a program's data stack. In particular, a PA-caused memory translation fault looks like any other pointer dereference issue, and thus it carries no information about the nature of the pointer corruption that caused the fault—i.e., it just looks like the memory translation fault was caused an invalid pointer. This invalid pointer could have been the result of a PA pointer invalidation that mitigated against a ROP attack on the program's data stack; or it could have been the result of a programming bug that wrote an invalid pointer value, or that otherwise corrupted the pointer value on the program's data stack.

At least some embodiments described herein determine whether a memory pointer was likely invalidated by a PA failure. For example, in embodiments, a memory fault handler is configured to analyze a memory pointer that triggered a memory fault (e.g., a memory translation fault) to determine if that pointer would correspond to a memory address that falls within an executable memory location if a PA invalidation of the pointer is reversed. To accomplish this, in embodiments the memory fault handler identifies a memory pointer that triggered a memory fault, and then attempts to "fix-up" the memory pointer by setting reserved bits (which are used by PA to store a PAC) to a default value for those reserved bits (e.g., all 1's, all 0's, etc., as defined by a processor ISA). The memory fault handler then determines if this "fixed-up" memory pointer corresponds to a memory address that falls within an executable memory location. In embodiments, this determination is based on determining that the memory address is within an executable memory page (e.g., a memory page without a corresponding NX bit being set), determining that a call instruction is stored at a prior memory address that immediately precedes the memory address (i.e., it would make sense that code would be returning to this location when exiting from a subroutine), and/or determining that the memory address corresponds to a memory region mapped to a code section (e.g., .text) of an executable file.

When the memory pointer is determined to have been likely invalidated by a PA failure (and thus the memory fault resulted from a failed PAC authentication), at least some embodiments handle the memory fault in view of a PA failure having occurred. In embodiments, this handling includes logging the PA failure, terminating a program that caused the PA failure, and/or by resuming execution of the program at a machine code instruction corresponding to the fixed-up memory pointer. In contrast, when the memory pointer is determined to not have been likely invalidated by a PA failure (and thus the memory fault resulted from an invalid pointer, likely resulting from a programming bug), at least some embodiments handle the memory fault as would be normal for a typical invalid pointer (e.g., by terminating the program with a segmentation fault).

By distinguishing between memory faults that resulted from failed PAC authentication and memory faults that resulted from an invalid pointer, the embodiments herein provide a technical effect and technical improvement of generating valuable log information that can be used to identify and fix PA incompatibilities in a program (thereby addressing bugs and faults in the program), or that can be used to detect a ROP-style attack (thereby promoting security). Further, the embodiments herein provide a technical effect and technical improvement of enabling rich memory fault handling modes. In embodiments, these memory fault handling modes include a "strict mode" that terminates a program when any PA failure occurs during the program's execution, while potentially logging the PA failure. In embodiments, these memory fault handling modes also include a "compatibility mode" that terminates a program in light of some PA failures and permits the program to continue executing in light of other PA failures, while potentially logging each PA failure. In embodiments, the compatibility mode terminates the program when the PA failure is caused by the program's code or by a "compatible" module loaded by the program, and permits the program to continue executing when the PA failure is caused by an "incompatible" module loaded by the program or by dynamic code generated by the program. In embodiments, these memory fault handling modes also include an "audit mode" that logs each PA failure by a program without actually terminating the program.

In embodiments, method, systems, and computer program products handle a memory fault based on detecting whether a memory pointer was invalidated by a PA failure. These embodiments identify a memory pointer, an access to which caused a memory fault at the processor during execution of an application program. These embodiments also detect that the memory pointer was invalidated by a PA failure. The detection includes creating a new memory pointer by replacing a plurality of reserved bits of the memory pointer with a default value of the plurality of reserved bits, and determining that the new memory pointer corresponds to a memory address that falls within an executable memory location. The determination is based on at least one of determining that the memory address is within an executable memory page, determining that a call instruction is stored at a prior memory address that immediately precedes the memory address, or determining that the memory address corresponds to a memory region mapped to a code section of an executable file. Based at least on detecting that the memory pointer was invalidated by a PA failure, these embodiments also handle the PA failure, including performing at least one of logging the PA failure, terminating the application program, or resuming execution at a machine code instruction stored at the memory address.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates an example of wrapping a function with PA instructions; and

DETAILED DESCRIPTION

Figure 1A:
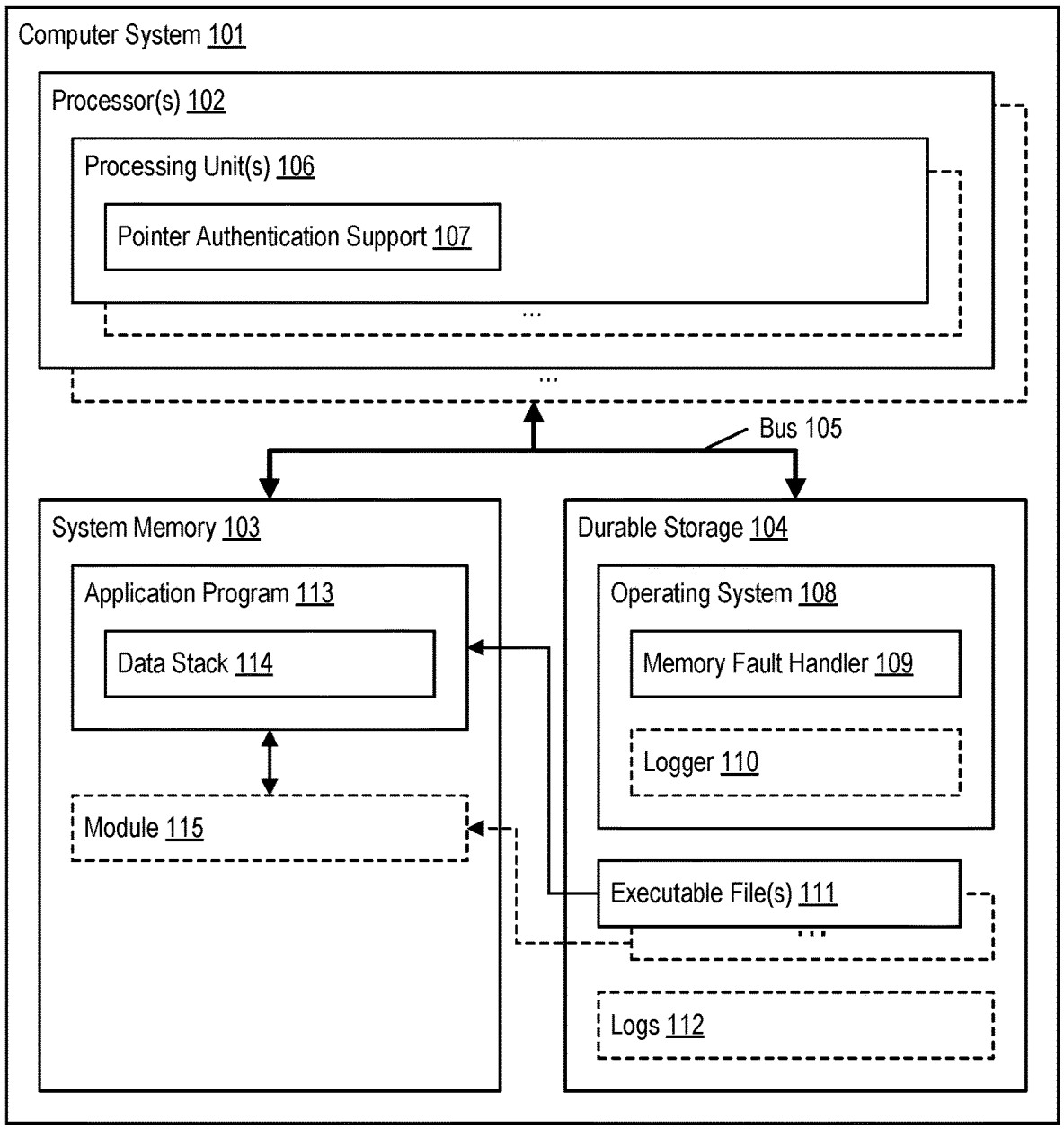
FIG. 1A illustrates an example computer architecture that facilitates detecting whether a memory pointer was invalidated by a PA failure.

FIG. 1A illustrates an example computer architecture 100 that facilitates detecting whether a memory pointer was invalidated by a PA failure (i.e., a failure to validate a PAC stored within an authenticated pointer). Computer architecture 100 includes a computer system 101 that comprises or utilizes a special-purpose or general-purpose computer hardware, such as, for example, a processor 102 (or a plurality of processors), system memory 103, and durable storage 104, which are communicatively coupled using a bus 105 (or a plurality of busses).

Embodiments within the scope of the present invention include physical and other computer-readable media for carrying or storing computer-executable instructions and/or data structures. Such computer-readable media can be any available media that are accessible by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module, and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1A, the processor 102 includes (among other things) a processing unit 106 (or a plurality of processing units), which loads and executes machine code instructions from system memory 103 (usually via one or more processor caches, not shown). In some embodiments, the processor 102 includes gate logic and/or microcode that provide pointer authentication support 107 (PA support 107) by the processor 102. The particular functionality of PA support 107 can vary depending on design choices, but example functionality includes one or more instructions (e.g., pac-prefixed instructions in the ARM ISA) that create an authenticated pointer by inserting a PAC into the pointer, and one or more instructions (e.g., aut-prefixed instructions in the ARM ISA) that authenticate a PAC stored in a pointer. However, it will be appreciated that the embodiments herein could be implemented without PA support 107 in the processor 102. For example, PA functionality could instead be implemented in software, such as by an operating system and/or as instructions complied into procedure prologues and epilogues of an application binary.

As illustrated, the durable storage 104 stores computer-executable instructions and/or data structures representing executable software components; correspondingly, during execution of this software at the processor 102, one or more portions of these computer-executable instructions and/or data structures are loaded into system memory 103. For example, the durable storage 104 is shown as storing computer-executable instructions and/or data structures corresponding to an operating system 108 and an executable file 111 (or a plurality of executable files). In embodiments each executable file 111 corresponds to an application program, or a module or library that can be loaded by the application program. The durable storage 104 can also store data, such as logs 112. The operating system 108 is shown as including a memory fault handler 109, and as potentially as including a logger 110 (i.e., for logging data to the logs 112, such as a kernel log).

The system memory 103 is capable of storing a broad variety of data, but for purposes of illustrating the embodiments herein, the system memory 103 is shown as storing at least memory data corresponding to an application program 113 that (as indicated) executes from an executable file 111. For example, the memory data for application program 113 is shown as including a data stack 114 (sometimes referred to as a call stack). The system memory 103 is also shown as potentially storing at least memory data corresponding to a module 115 that (as indicated) executes from another executable file 111. As indicated, when present, the module 115 is utilized by the application program 113 and, in embodiments, is loaded into the memory space of the application program 113.

Figure 2:
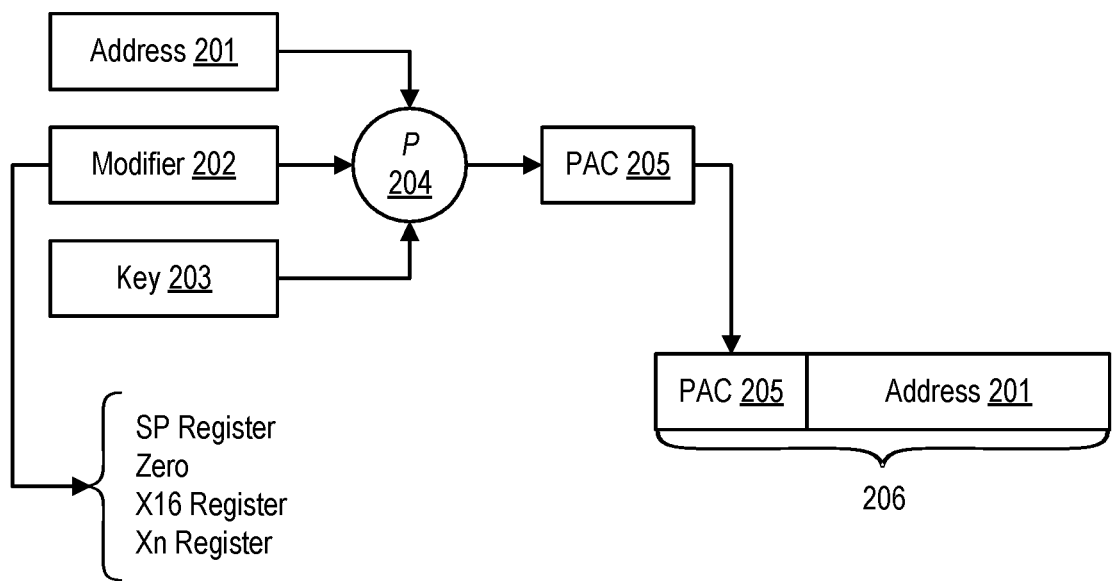
FIG. 2 illustrates an example of a PAC computation.

In embodiments, the memory fault handler 109 executes based on the occurrence of a memory-related fault—such as a memory translation fault—that occurs in connection with execution of an instruction by a processing unit 106. Thus, in embodiments, the memory fault handler 109 includes at least functionality to handle memory faults based on detecting whether a memory pointer was invalidated by a PA failure. In order to explain how the memory fault handler 109 can detect whether a memory pointer was invalidated by a PA failure, a brief description of operation PA is now described in connection with FIG. 2, which illustrates an example 200 of a PAC computation; and in connection with FIG. 3, which illustrates an example 300 of wrapping a function with PA instructions.

In many processor architectures, the processor defines a pointer to include a plurality of reserved bits (e.g., the upper sixteen bits in the ARM ISA) plus the actual memory address being pointed to. In embodiments, PA technologies store a signature (e.g., a PAC) within these reserved bits to transform a pointer into an authenticated pointer. Thus, referring to FIG. 2, example 200 shows that in embodiments an authenticated pointer 206 comprises a PAC 205 that is stored within reserved bits of the authenticated pointer 206, and an address 201 comprising the pointed-to address. As shown, in embodiments this PAC 205 is calculated using a function 204 (P) that takes as input the address 201, a modifier 202, and a key 203. In embodiments, the ARM ISA uses one or more registers (e.g., SP, X16, Xn) and/or a value (e.g., zero) for the modifier 202.

Turning now to FIG. 3, example 300 shows table comprising a column 301 showing an example ARM-based subroutine structure that lacks return address protection, and a column 302 showing an example ARM-based subroutine structure that uses PAC-based return address protection. As shown in column 301, a subroutine structure that includes a prologue (lines 2 and 3) that saves a return address stored in a link register (lr) to a stack (e.g., data stack 114) and that advances a stack pointer to create a new stack frame. The subroutine structure also includes a body, represented by ellipses at line 4, comprising one or more instructions. The subroutine structure also includes an epilogue (lines 5 and 6) that removes a stack frame and loads the saved return address into the link register. The subroutine structure also includes a return to the address stored in the link register (line 8).

As shown in column 302, in embodiments, PAC-based return address protection adds a paciasp instruction (line 1) to the prologue, and adds an autiasp instruction (line 7) to the epilogue. The paciasp instruction transforms the link register into an authenticated pointer 206 by calculating a PAC 205 (using the stack pointer as the modifier 202) and by inserting the PAC 205 into reserved bits of the link register. Thus, the return address saved at line 2 is an authenticated pointer 206 based on the actual return address. The autiasp instruction then authenticates the link register after the saved return address has been loaded from the data stack (e.g., data stack 114) into the link register. So long as the return address saved at line 2 was not modified by the subroutine body, the autiasp instruction calculates the value that is stored in the reserved bits of the link register, and restores the reserved bits to their default value (e.g., all 1's or all 0's); thus, the subsequent return instruction (line 8) succeeds. If, however, the return address saved at line 2 was modified by the subroutine body (e.g., due to ROP), the autiasp instruction calculates a different value than is stored in the reserved bits of the link register, and scrambles the reserved bits; thus, the subsequent return instruction (line 8) causes a memory fault.

When handling a memory fault, that fault looks the same to the memory fault handler 109 regardless of whether the fault was caused by a general programming bug in which some instruction tried to access an invalid pointer, or whether the fault was caused by a PA authentication instruction (e.g., autiasp) having scrambled reserved bits in an otherwise valid pointer due to a failure to verify a PAC for that pointer. In accordance with the embodiments herein, the memory fault handler 109 determines if a memory pointer was likely invalidated by a PA failure based on "fixing-up" the pointer by setting reserved bits in the pointer to a default value (e.g., all 1's or all 0's, as defined by a processor ISA), and then determining if that "fixed-up" memory pointer corresponds to a memory address that falls within an executable memory location. If so, then it is likely that the pointer that caused the memory fault was invalidated after a PA failure. Otherwise, then it is likely that the pointer that caused the memory fault was never actually corresponded to a valid memory address.

Figure 1B:
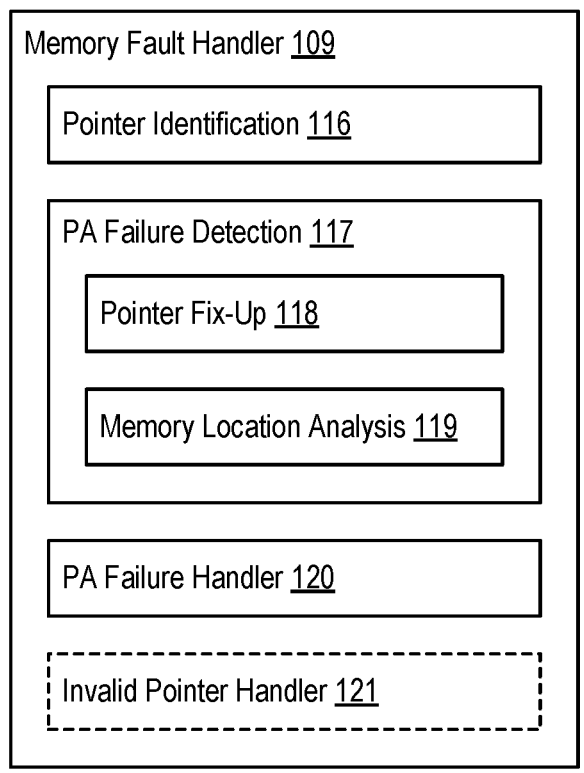
FIG. 1B illustrates an example memory fault handler.

FIG. 1B illustrates details of the memory fault handler 109, including example components that facilitate memory fault handling based on detecting whether a memory pointer was invalidated by a PA failure, according to some embodiments. It will be appreciated that the depicted components—including their identity, sub-components, and arrangement—are presented merely as an aid in describing various embodiments of the memory fault handler 109, as described herein, and that these components are non-limiting to how software and/or hardware might implement various embodiments described herein, or of the particular functionality thereof.

Figure 4:
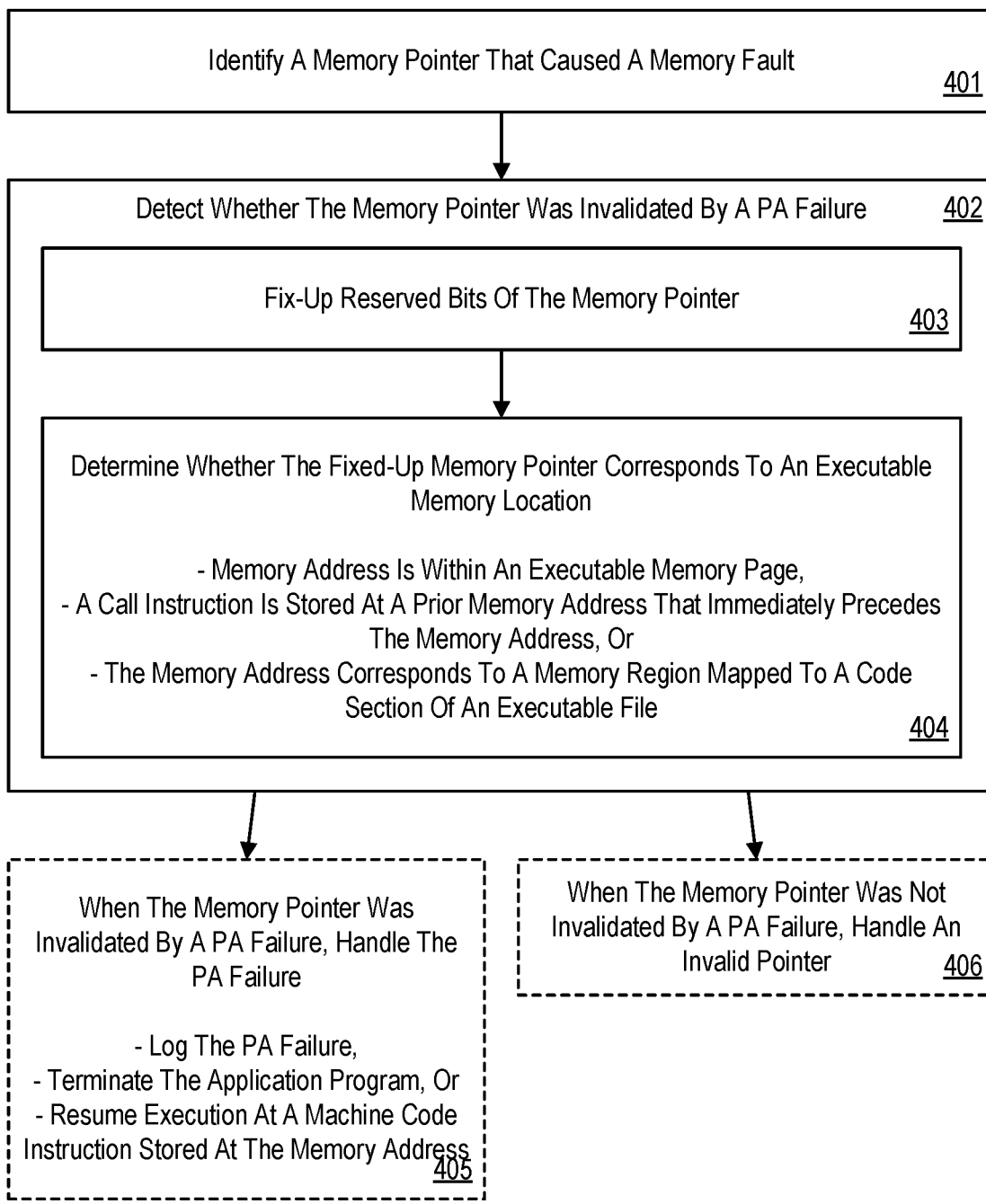
FIG. 4 illustrates a flow chart of an example method for memory fault handling based on detecting whether a memory pointer was invalidated by a PA failure.

The components of the memory fault handler 109 are now described in connection with FIG. 4, which illustrates a flow chart of an example method 400 for memory fault handling based on detecting whether a memory pointer was invalidated by a PA failure. In embodiments, instructions for implementing method 400 are encoded as computer-executable instructions stored on a hardware storage device (e.g., durable storage 104) that are executable by a processor (e.g., processor 102) to cause a computer system (e.g., computer system 101) to perform method 400. In embodiments, these computer-executable instructions correspond to memory fault handler 109, such that method 400 is implemented by a memory fault handler of an operating system kernel.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Referring to FIG. 1B, the memory fault handler 109 is shown as including a pointer identification component 116. In embodiments, when the memory fault handler 109 is invoked as a result of a memory fault by the processor 102, the pointer identification component 116 identifies which memory pointer caused that memory fault. In embodiments, this pointer is provided to the memory fault handler 109 by the processor 102 as part of triggering the memory fault handler 109, or is otherwise accessible at the processor 102 (e.g., by reading a processor register). Referring to FIG. 4, method 400 comprises an act 401 of identifying a memory pointer that caused a memory fault. In some embodiments, act 401 comprises identifying a memory pointer, an access to which caused a memory fault at the processor during execution of an application program. While a variety of memory fault types may exist, in some embodiments the memory fault identified in act 401 is a memory translation fault.

Referring to FIG. 3 and column 302, in one example of act 401, if, during execution of application program 113, the autiasp instruction at line 7 invalidates the pointer in the link register due to a PA failure (e.g., by scrambling the reserved bits of the pointer), the ret instruction at line 8 attempts to dereference an invalid pointer and thus causes a memory fault at the processor 102—which triggers the memory fault handler 109; in this case, the pointer identification component 116 would identify this invalidated pointer. In another example of act 401, if, during execution of application program 113, a load or store instruction in the subroutine body (ellipses at line 4) attempts to access an invalid pointer (e.g., which is invalid due to a bug), then that load or store instruction attempts to dereference an invalid pointer and thus causes a memory fault at the processor 102—which triggers the memory fault handler 109; in this case, the pointer identification component 116 would identify this invalid pointer. Either way, there is no indication to the memory fault handler 109 whether this memory fault was caused by a PA failure invalidating the pointer.

Returning to FIG. 1B, the memory fault handler 109 is also shown as including a PA failure detection component 117. In embodiments, the PA failure detection component 117 determines whether the memory pointer identified by the pointer identification component 116 was likely invalidated by a PA failure by attempting to reverse the effects of PA. Referring to FIG. 4, method 400 also comprises an act 402 of detecting whether the memory pointer was invalidated by a PA failure. Technical effects of act 402 include distinguishing between memory faults that resulted from failed PAC authentication, and memory faults that resulted from an invalid pointer.

In an example, if, during execution of application program 113, the memory fault handler 109 was triggered by a ret instruction attempting to dereference a pointer that was invalidated by an autiasp instruction, then the PA failure detection component 117 determines that the pointer was invalidated by a PA failure. In another example, if, during execution of application program 113, the memory fault handler 109 was triggered by a load or store instruction attempting to dereference an invalid pointer, then the PA failure detection component 117 determines that the pointer was not invalidated by a PA failure.

In some embodiments, the PA failure detection component 117 only operates when the processor 102 is determined to comprise PA support 107 and/or when the application program 113 that was executing at the time of the memory fault was compiled with support for PA (e.g., by including PAC-based return address protection, as shown in column 302). Thus, in some embodiments, method 400 detects whether the memory pointer was invalidated by a PA failure only when the processor is determined to be PA capable. In additional, or alternative embodiments, method 400 detects whether the memory pointer was invalidated by a PA failure only when a PA feature is determined to be enabled for the application program.

As explained previously, embodiments determine if a memory pointer was likely invalidated by a PA failure by "fixing-up" the pointer by setting reserved bits of the pointer to a default value (e.g., all 1's, all 0's, etc., as defined by a processor ISA), and by then determining if this "fixed-up" memory pointer corresponds to a memory address that falls within an executable memory location. Thus, referring returning to FIG. 1B, the PA failure detection component 117 is shown as including a pointer fix-up component 118 and a memory location analysis component 119.

In embodiments, the pointer fix-up component 118 attempts to reverse a PA invalidation of a memory pointer by setting the reserved bits of the pointer to default value for the ISA (e.g., all 1's, all 0's, etc.). Referring to FIG. 4, as shown, act 402 comprises an act 403 of fixing-up reserved bits of the memory pointer. In some embodiments, act 403 comprises creating a new memory pointer by replacing a plurality of reserved bits of the memory pointer with a default value of the plurality of reserved bits. In an example, and referring to FIG. 2, in the ARM ISA, the pointer fix-up component 118 replaces the upper sixteen bits of the pointer with a default value for those reserved bits. If this pointer was invalidated by a PAC validation failure, operation of the pointer fix-up component 118 has a technical effect of restoring the pointer to a state it was in prior insertion of a PAC 205 into the pointer (e.g., prior to execution of an aut instruction). If this pointer was otherwise invalid, then the pointer likely remains invalid (e.g., not pointing to a valid memory address, not pointing to an executable memory page, etc.) after operation of the pointer fix-up component 118.

In embodiments, the memory location analysis component 119 determines whether, or not, the "fixed-up" memory pointer generated by the pointer fix-up component 118 corresponds to a memory address that falls within an executable memory location. Referring to FIG. 4, as shown, act 402 also comprises an act 404 of determining whether the fixed-up memory pointer corresponds to an executable memory location. Thus, in some embodiments, act 404 comprises determining that the new memory pointer corresponds to a memory address that falls within an executable memory location. In an example, if a memory pointer used by a ret instruction was invalidated by a PA failure, "fixing-up" the memory pointer by setting reserved bits in the pointer to a default value should result in a memory pointer that corresponds to a memory address that falls within an executable memory location. In this case, act 402 detects that the memory pointer was invalidated by a PA failure, and method 400 proceeds to act 405.

In other embodiments, act 404 comprises determining that the new memory pointer does not correspond to a memory address that falls within an executable memory location. In an example, if a memory pointer used by a load or store instruction was invalid due to a bug, "fixing-up" the memory pointer by setting reserved bits in the pointer to a default value will probably not result in a memory pointer that corresponds to a memory address that falls within an executable memory location. In this case, act 402 detects that the memory pointer was not invalidated by a PA failure, and method 400 proceeds to act 406.

There are various ways in which the memory location analysis component 119 can determine if a "fixed-up" memory pointer corresponds to a memory address that falls within an executable memory location, which the memory location analysis component 119 can employ singly, or in combination.

In one embodiment, the memory location analysis component 119 determines whether the memory address is within an executable memory page. For example, in systems that implement an NX bit and DEP, the memory location analysis component 119 can determine (e.g., using a memory page table) whether or not a memory page to which the fixed-up memory pointer points has a corresponding NX bit, and determine that the memory address is within an executable memory page when the NX bit set to a state that indicates executable memory. Thus, in embodiments, determining that the new memory pointer corresponds to a memory address that falls within an executable memory location in act 404 is based on at least determining that the memory address is within an executable memory page.

In another embodiment, the memory location analysis component 119 determines whether a call instruction is stored at a prior memory address that immediately precedes the memory address. For example, it is typical for a return address to fall immediately after a call instruction. Thus, it would make sense that code would be returning to a memory location following a call instruction when exiting from a subroutine. Thus, in embodiments, determining that the new memory pointer corresponds to a memory address that falls within an executable memory location in act 404 is based on at least determining that a call instruction is stored at a prior memory address that immediately precedes the memory address.

In another embodiment, the memory location analysis component 119 determines that the memory address corresponds to a memory region mapped to a code section. For example, applications and libraries execute based on loading an executable file—such as a portable executable (PE) file or an Executable and Linkable Format (ELF) file—and a memory address corresponds to an executable memory location if that memory location is mapped to a code (e.g., .text) section of an executable file. Thus, in embodiments, determining that the new memory pointer corresponds to a memory address that falls within an executable memory location in act 404 is based on at least determining that the memory address corresponds to a memory region mapped to a code section of an executable file (e.g., an executable file 111 corresponding to application program 113, or a module 115 loaded by application program 113).

Returning to FIG. 1B, the memory fault handler 109 is also shown as including a PA failure handler 120. In embodiments, the PA failure handler 120 handles the memory fault in view of a PA failure having occurred. Returning to FIG. 4, when act 402 detects that the memory pointer was invalidated by a PA failure, method 400 may comprises an act 405 of, when the memory pointer was invalidated by a PA failure, handling the PA failure. In some embodiments, act 405 comprises, based at least on detecting that the memory pointer was invalidated by a PA failure, handling the PA failure.

There are various actions that the PA failure handler 120 can take to handle a PA failure, which the PA failure handler 120 can employ singly, or in combination.

In one embodiment, the PA failure handler 120 logs the PA failure. For example, the PA failure handler 120 employs the logger 110 to log the PA failure to the logs 112. Thus, in embodiments, handling the PA failure in act 405 includes performing at least logging the PA failure. In this embodiment, technical effects of act 405 include generating log information that can be used to identify and fix PA incompatibilities in a program (thereby addressing bugs and faults in the program), or that can be used to detect a ROP-style attack (thereby promoting security).

In another embodiment, the PA failure handler 120 terminates a program that caused the PA failure. For example, the PA failure handler 120 causes a termination of application program 113. Thus, in embodiments, handling the PA failure in act 405 includes performing at least terminating the application program. In this embodiment, technical effects of act 405 include preventing execution of a program after a possible ROP attack, thereby preserving system security by preventing a malicious actor from executing code of their choice.

In another embodiment, the PA failure handler 120 resumes execution of the program at a machine code instruction corresponding to the fixed-up memory pointer. For example, the PA failure handler 120 enables execution of application program 113 to resume by executing an instruction stored at a memory address pointed by the fixed-up memory pointer. Thus, in embodiments, handling the PA failure in act 405 includes performing at least resuming execution at a machine code instruction stored at the memory address. In this embodiment, technical effects of act 405 include avoiding interruption of application execution, even in light of a possible ROP attack.

In embodiments, the PA failure handler 120 supports a variety of enforcement modes. In embodiments, each enforcement mode takes different remedial action(s) when PA failures are detected by the PA failure detection component 117.

In embodiments, the enforcement modes include, as a most restrictive mode, a "strict mode" in which the PA failure handler 120 terminates a program (e.g., application program 113) when any PA failure occurs during the program's execution. Thus, based on the application program executing in a strict mode, in some embodiments of act 405 handling the PA failure comprises terminating the application program.

In embodiments, the PA failure handler 120 also logs PA failures in the logs 112 (e.g., using logger 110) when operating in the strict mode. Thus, based on the application program executing in a strict mode, in some embodiments of act 405 handling the PA failure comprises logging the PA failure.

In embodiments the enforcement modes also include, as a moderately restrictive mode, a "compatibility mode" in which the PA failure handler 120 terminates a program (e.g., application program 113) in light of some PA failures, but permits the program to continue executing in light of other PA failures. In embodiments, when operating in the compatibility mode, the PA failure handler 120 terminates a program when the PA failure is caused by the program's own code, or when the PA failure is caused by a module (e.g., module 115) that is classified as being compatible with PA and that is loaded by the program. Thus, in some embodiments, act 404 comprises determining that the memory address corresponds to a memory region mapped to a code section of an executable file. Then, when the executable file corresponds to the application program, and based on the application program executing in a compatibility mode, in some embodiments of act 405 handling the PA failure comprises terminating the application program when the executable file corresponds to the application program. Alternatively, when the executable file corresponds to a PA compatible module loaded by the application program, and based on the application program executing in a compatibility mode, in some embodiments of act 405 handling the PA failure comprises terminating the application program when the executable file corresponds to a PA compatible module.

In embodiments, when operating in the compatibility mode, the PA failure handler 120 permits a program to continue executing when the PA failure is caused by a module (e.g., module 115) that is classified as incompatible with PA (which, in embodiments, includes an unknown compatibly with PA) and that is loaded by the program, or when the PA failure is caused by dynamic code generated by the program. Thus, in some embodiments, act 404 comprises determining that the memory address corresponds to a memory region mapped to a code section of an executable file. Then, when the executable file corresponds to a PA incompatible module loaded by the application program, and based on the application program executing in a compatibility mode, in some embodiments of act 405 handling the PA failure comprises resuming execution at the machine code instruction stored at the memory address when the executable file is a binary loaded by the application program. In other embodiments, based on the application program executing in a compatibility mode, in some embodiments of act 405 handling the PA failure comprises resuming execution at the machine code instruction stored at the memory address when the memory address stores a dynamic code instruction.

In any case, in embodiments the PA failure handler 120 also logs PA failures in the logs 112 (e.g., using logger 110) when operating in the compatibility mode. Thus, based on the application program executing in a compatibility mode, in some embodiments of act 405 handling the PA failure also comprises logging the PA failure.

In embodiments the enforcement modes also include, as a least restrictive enforcement mode, an "audit mode" in which the PA failure handler 120 logs each PA failure by a program (e.g., application program 113) without actually terminating the program. In embodiments, the audit mode is usable to run a program with PA support active, in order to identify behaviors that cause PA failures (e.g., as part of testing compatibility, in order to identify bugs, etc.), without actually terminating the program when PA failures occur. Thus, based on the application program executing in an audit mode, in some embodiments of act 405 handling the PA failure comprises (i) logging the PA failure, and (ii) resuming execution at the machine code instruction stored at the memory address.

Thus, in embodiments, technical effects of act 405 include enabling rich memory fault handling modes, such as a strict mode that terminates a program when any PA failure occurs during the program's execution (while potentially logging the PA failure), a compatibility mode that terminates a program in light of some PA failures and permits the program to continue executing in light of other PA failures (while potentially logging each PA failure), and an audit mode that logs each PA failure by a program without actually terminating the program.

Returning to FIG. 1B, the memory fault handler 109 is also shown as including an invalid pointer handler 121. In embodiments, the invalid pointer handler 121 handles the memory fault as would be conventional, such as by terminating the application with a segmentation fault or other error state. Returning to FIG. 4, when act 402 detects that the memory pointer was not invalidated by a PA failure, method 400 comprises an act 406 of, when the memory pointer was not invalidated by a PA failure, handling an invalid pointer.

In embodiments, the principles described herein operate in an "offline" postmortem analysis mode, either at computer system 101, or at some other computer system. In these embodiments, a computer system performing the postmortem analysis analyzes telemetry data received from the computer system 101, and potentially from one or more other computer systems. This telemetry data includes pointers that caused memory faults, and the postmortem analysis performs the analysis described in connection with the PA failure detection component 117 to determine if these memory faults were caused by pointer invalidations after PA failures. In embodiments, PA failure detections made by this postmortem analysis are used to identify malicious ROP behaviors and/or to identify program bugs (including PA incompatibilities). As will appreciated, a postmortem analysis of telemetry data received from a plurality of computer systems can be used to improve the accuracy of the identification of malicious ROP behaviors and/or program bugs (including PA incompatibilities).

Accordingly, the embodiments described herein determine whether a memory pointer was likely invalidated by a PA failure. This is based on identifying a memory pointer that triggered a memory fault, "fixing-up" the memory pointer by setting reserved bits to a default value, and determining if this "fixed-up" memory pointer corresponds to a memory address that falls within an executable memory location. When the memory pointer is determined to have been likely invalidated by a PA failure (and thus the memory fault resulted from a failed PAC authentication), the embodiments described herein handle the memory fault by logging the PA failure, terminating a program that caused the PA failure, and/or by resuming execution of the program at a machine code instruction corresponding to the fixed-up memory pointer.

By distinguishing between memory faults that resulted from failed PAC authentication and memory faults that resulted from an invalid pointer, the embodiments described herein provide a technical effect of generating log information that can be used to identify and fix PA incompatibilities in a program (thereby addressing bugs and faults in the program), or that can be used to detect a ROP-style attack (thereby promoting security). Further, the embodiments described herein provide a technical effect of enabling rich memory fault handling modes.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its essential characteristics. Such embodiments may include a data processing device comprising means for carrying out one or more of the methods described herein; a computer program comprising instructions which, when the program is executed by a computer, cause the computer to carry out one or more of the methods described herein; and/or a hardware storage device comprising instructions which, when executed by a computer, cause the computer to carry out one or more of the methods described herein. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor, for memory fault handling based on detecting whether a memory pointer was invalidated by a pointer authentication (PA) failure, the method comprising:
   identifying a memory pointer, an access to which caused a memory fault at the processor during execution of an application program;
   detecting that the memory pointer was invalidated by a PA failure, including:
   creating a new memory pointer by replacing a plurality of reserved bits of the memory pointer with a default value of the plurality of reserved bits; and
   determining that the new memory pointer corresponds to a memory address that falls within an executable memory location, based on at least one of:

determining that a call instruction is stored at a prior memory address that immediately precedes the memory address; or determining that the memory address corresponds to a memory region mapped to a code section of an executable file; and based at least on detecting that the memory pointer was invalidated by a PA failure, handling the PA failure, including performing at least one of:

logging the PA failure;

terminating the application program; or resuming execution at a machine code instruction stored at the memory address.

2. The method of claim 1, wherein the memory fault is a memory translation fault.

3. The method of claim 1, the method being implemented by a memory fault handler of an operating system kernel.

4. The method of claim 1, wherein the method detects whether the memory pointer was invalidated by a PA failure only when the processor is determined to be PA capable.

5. The method of claim 1, wherein the method detects whether the memory pointer was invalidated by a PA failure only when the application program was compiled with support for PA.

6. The method of claim 1, wherein, based on the application program executing in an audit mode, handling the PA failure comprises (i) logging the PA failure, and (ii) resuming execution at the machine code instruction stored at the memory address.

7. The method of claim 1, wherein, based on the application program executing in a strict mode, handling the PA failure comprises (i) logging the PA failure, and (ii) terminating the application program.

8. The method of claim 1, wherein, the method includes determining that the memory address corresponds to a memory region mapped to a code section of an executable file; and based on the application program executing in a compatibility mode, handling the PA failure comprises terminating the application program when the executable file corresponds to the application program.

9. The method of claim 1, wherein, the method includes determining that the memory address corresponds to a memory region mapped to a code section of an executable file; and based on the application program executing in a compatibility mode, handling the PA failure comprises resuming execution at the machine code instruction stored at the memory address when the executable file is a binary loaded by the application program.

10. The method of claim 1, wherein determining that the new memory pointer corresponds to a memory address that falls within an executable memory location comprises determining that the memory address is within an executable memory page.

11. The method of claim 1, wherein determining that the new memory pointer corresponds to a memory address that falls within an executable memory location comprises determining that a call instruction is stored at a prior memory address that immediately precedes the memory address.

12. The method of claim 1, wherein determining that the new memory pointer corresponds to a memory address that falls within an executable memory location comprises determining that the memory address corresponds to a memory region mapped to a code section of an executable file.

13. A computer system for memory fault handling based on detecting whether a memory pointer was invalidated by a pointer authentication (PA) failure, comprising:

a processor; and a hardware storage device that stores computer-executable instructions that are executable by the processor to cause the computer system to at least:

identify a memory pointer, an access to which caused a memory fault at the processor during execution of an application program;

detect that the memory pointer was invalidated by a PA failure, including:

creating a new memory pointer by replacing a plurality of reserved bits of the memory pointer with a default value of the plurality of reserved bits; and determining that the new memory pointer corresponds to a memory address that falls within an executable memory location, based on at least one of:

determining that a call instruction is stored at a prior memory address that immediately precedes the memory address; or determining that the memory address corresponds to a memory region mapped to a code section of an executable file; and based at least on detecting that the memory pointer was invalidated by a PA failure, handle the PA failure, including performing at least one of:

logging the PA failure;

terminating the application program; or resuming execution at a machine code instruction stored at the memory address.

14. The computer system of claim 13, wherein the computer-executable instructions are executable by the processor to cause the computer system to detect whether the memory pointer was invalidated by a PA failure only when the processor is determined to be PA capable.

15. The computer system of claim 13, wherein the computer-executable instructions are executable by the processor to cause the computer system to detect whether the memory pointer was invalidated by a PA failure only when the application program was compiled with support for PA.

16. The computer system of claim 13, wherein, based on the application program executing in an audit mode, handling the PA failure comprises (i) logging the PA failure, and (ii) resuming execution at the machine code instruction stored at the memory address.

17. The computer system of claim 13, wherein, based on the application program executing in a strict mode, handling the PA failure comprises (i) logging the PA failure, and (ii) terminating the application program.

18. The computer system of claim 13, wherein, the computer system determines that the memory address corresponds to a memory region mapped to a code section of an executable file; and based on the application program executing in a compatibility mode, handling the PA failure comprises terminating the application program when the executable file corresponds to the application program.

19. The computer system of claim 13, wherein, the computer system determines that the memory address corresponds to a memory region mapped to a code section of an executable file; and based on the application program executing in a compatibility mode, handling the PA failure comprises resuming execution at the machine code instruction stored at the memory address when the executable file is a binary loaded by the application program.

20. A hardware storage device that stores computer-executable instructions that are executable by a processor to cause a computer system to handle a memory fault based on detecting whether a memory pointer was invalidated by a pointer authentication (PA) failure, the computer-executable instructions including instructions that are executable by the processor to cause the computer system to at least:
- identify a memory pointer, an access to which caused a memory fault at the processor during execution of an application program;
- detect that the memory pointer was invalidated by a PA failure, including:
  - creating a new memory pointer by replacing a plurality of reserved bits of the memory pointer with a default value of the plurality of reserved bits; and
  - determining that the new memory pointer corresponds to a memory address that falls within an executable memory location, based on at least one of:
    - determining that a call instruction is stored at a prior memory address that immediately precedes the memory address; or
    - determining that the memory address corresponds to a memory region mapped to a code section of an executable file; and
- based at least on detecting that the memory pointer was invalidated by a PA failure, handle the PA failure, including performing at least one of:
  - logging the PA failure;
  - terminating the application program; or
  - resuming execution at a machine code instruction stored at the memory address.

* * * * *